US011990109B2

(12) United States Patent
Koizumi

(10) Patent No.: US 11,990,109 B2
(45) Date of Patent: May 21, 2024

(54) HOLDER SYSTEM FOR A DRUM

(71) Applicant: Pearl Musical Instrument Co., Yachiyo (JP)

(72) Inventor: Takashi Koizumi, Yachiyo (JP)

(73) Assignee: Pearl Musical Instrument Co., Chiba (JP)

( * ) Notice: Subject to any disclaimer, the term of this patent is extended or adjusted under 35 U.S.C. 154(b) by 299 days.

(21) Appl. No.: 17/725,615

(22) Filed: Apr. 21, 2022

(65) Prior Publication Data

US 2023/0343309 A1 Oct. 26, 2023

(51) Int. Cl.
*G10D 13/02* (2020.01)
*G10D 13/10* (2020.01)

(52) U.S. Cl.
CPC ............. *G10D 13/28* (2020.02); *G10D 13/02* (2013.01)

(58) Field of Classification Search
CPC ......... G10D 13/28; G10D 13/02; G10D 13/00
See application file for complete search history.

(56) References Cited

U.S. PATENT DOCUMENTS 4,141,272 A 2/1979 Yamagisawa
5,803,642 A 9/1998 Sassmannshausen
8,710,342 B2 4/2014 Lin
8,759,654 B2 6/2014 Nakata et al.
2010/0313734 A1 12/2010 Yoshino et al.
2022/0068247 A1 * 3/2022 Stocksmith ............ G10D 13/02

FOREIGN PATENT DOCUMENTS

JP 57-18193 4/1982
JP 58-7430 2/1983

* cited by examiner

*Primary Examiner* — Kimberly R Lockett
(74) *Attorney, Agent, or Firm* — Manelli Selter PLLC; Edward Stemberger

(57) ABSTRACT

A holder system for a drum includes a body, holding structure within the body defining an adjustable opening, a fastener threadedly received in the body and engageable with the holding structure, a holding rod received in the opening such as to be able to be moved linearly and to rotate with respect to the body. Clamping structure has a portion disposed within the body and is associated with the holding structure. A shaft is received by the clamping structure such that the shaft can rotate about an axis thereof and rotate with respect to the body. When the fastener moved to engage the holding structure, the opening reduces in size and thus causes the holding structure to prevent any movement of the holding rod and, substantially simultaneously, a portion of the holding structure engages a part of the clamping structure causing the clamping structure to prevent any movement of the shaft.

20 Claims, 8 Drawing Sheets

HOLDER SYSTEM FOR A DRUM

FIELD

The present invention is directed to a holder system for drum, such as a tom-tom drum, and more particularly, to a holder system that accepts holding arms of different diameters and permits a holding arm to move in various directions for adjustment.

BACKGROUND

A conventional tom-tom drum holder includes a support shaft detachably secured to a bracket on a bass drum, tom-tom stand or clamp and a tom-tom holding rod detachably secured to a bracket on a tom-tom drum. A hinge is employed to connect the shaft and rod together in such a manner that the angular relationship between the shaft and rod can be adjusted. The hinge includes a ball and socket joint. However, the ball and socket joint has the disadvantage that the ball is fixed to an end of the rod and thus the rod cannot be moved linearly to-and-fro for adjustment. In addition, upon clamping and re-clamping on the ball, the ball may become deformed over time. Since the rod is fixed to the ball with a specified rod diameter, the rod cannot work with various brackets on a tom-tom drum.

Therefore, a need exists for a holder system for a drum that that accepts holding rods of different diameters, permits a holding rod to move in various directions including to-and-fro adjustment, and does not cause deformation upon clamping.

SUMMARY

An aspect of an embodiment provides a holder system for a drum including a body, holding structure disposed within the body to define an adjustable opening, a fastener threadedly received in the body and engageable with the holding structure, a holding rod having a proximal end received in the opening such that when the holding rod is in an unsecured condition when the fastener is not engaged with the holding structure, the holding rod can be moved linearly and be rotated with respect to the body, clamping structure having a portion disposed within the body and being associated with the holding structure, and a shaft received by the portion of the clamping structure such that in the unsecured condition, the shaft can rotate about a longitudinal axis thereof, and rotate with respect to the body. The holder system is constructed and arranged such that when the fastener moved to engage with the holding structure, the engagement causes the opening to reduce in size and thus causes the holding structure to clamp on and prevent any movement of the holding rod and, substantially simultaneously, a portion of the holding structure engages a part of the clamping structure causing the clamping structure to prevent any movement of the shaft, thereby defining a secured condition of the holding rod and shaft.

In accordance with another aspect of an embodiment, a holder system for a drum includes a body, an upper holding member disposed within the body, a lower holding member disposed within the body and coupled to the upper holding member to define an adjustable opening between the upper and lower holding members, a fastener threadedly received in the body and engageable with a surface of the upper holding member, a holding rod having a proximal end received in the opening such that when the holding rod is in an unsecured condition when the fastener is not engaged with the holding member, the holding rod can be moved linearly and be rotated with respect to the body. A pin is received in the body and is associated with a surface of the lower holding member. A resilient, generally cylindrical split ring is fixed to the body. The split ring has an adjustable bore there-through, with the pin being engaged with the split ring. First and second clamping members have portions received in the bore of the split ring so as to be rotatable with respect to the body. A shaft is received by the first and second clamping members such that in the unsecured condition, the shaft can rotate about a longitudinal axis thereof, and rotate with respect to the body. The holder system is constructed and arranged such that when the fastener is moved to engage the upper holding member, the upper holding member is pushed by the fastener causing the opening between the holding members to reduce in size and thus causing the holding members to clamp on and prevent any movement of the holding rod and, substantially simultaneously, the lower holding member pushes on the pin which causes the bore of the split ring to reduce in size causing the split ring to clamp on the clamping members to prevent any movement of the shaft, thereby defining a secured condition of the holding rod and shaft.

Other aspects of the embodiments, including apparatus, articles, methods, systems, assemblies, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description, serve to explain the principles of the invention. In such drawings.

DETAILED DESCRIPTION OF EXAMPLE EMBODIMENTS

Reference will now be made in detail to exemplary embodiments of the invention. It should be noted, however, that the invention in its broader aspects is not necessarily limited to the specific details, representative materials and methods, and illustrative examples shown and described in connection with the exemplary embodiments.

Figure 1:
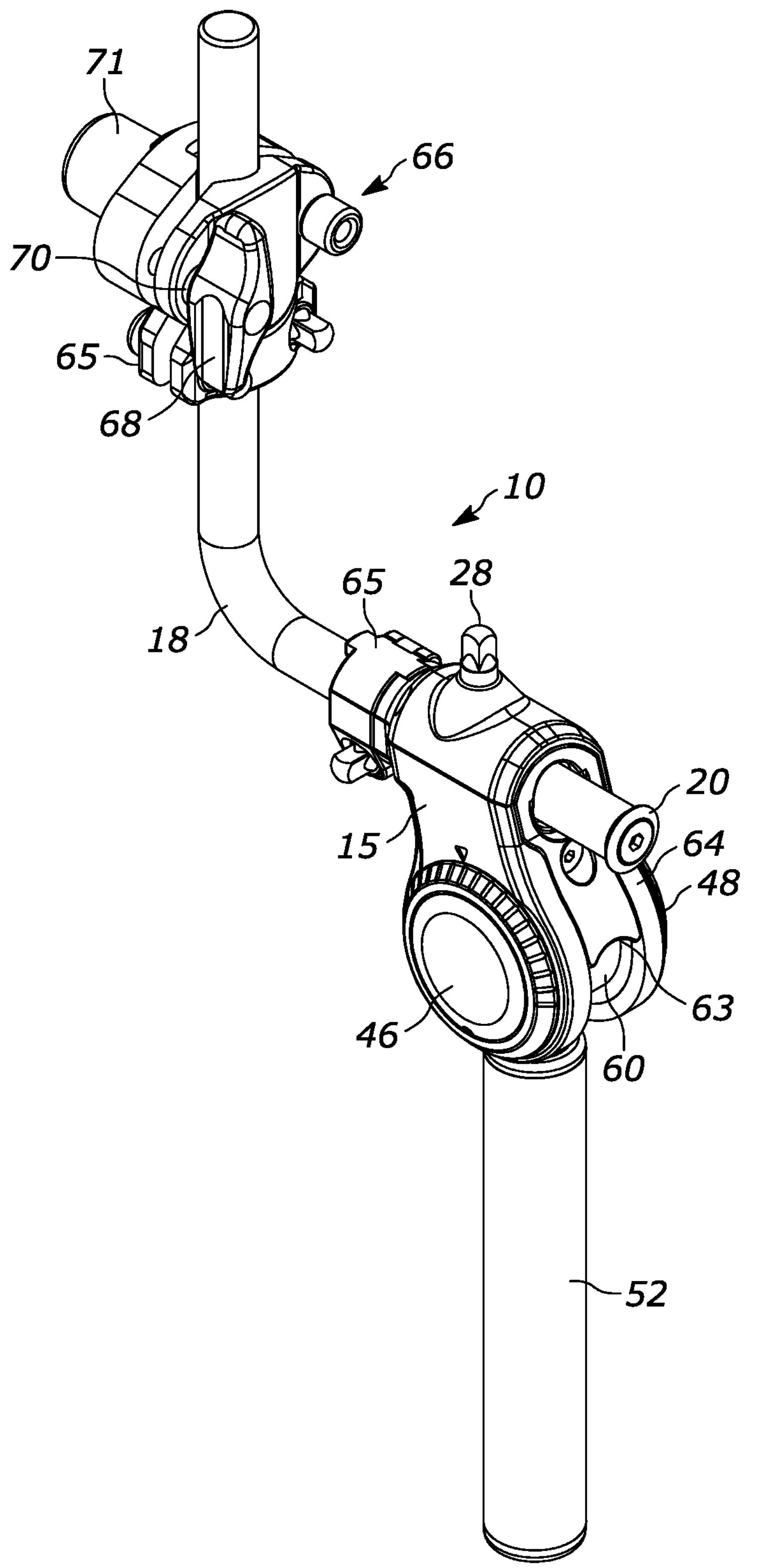
FIG. 1 is a perspective view of a holder system for a drum in accordance with an exemplary embodiment of the present disclosure.

FIG. 1 is a perspective view of a holder system, shown generally indicated at 10, in accordance with an exemplary embodiment of the present disclosure, for holding a drum, such as a tom-tom drum, with respect to a tom-tom stand, clamp or another drum, such as a bass drum.

Figure 2:
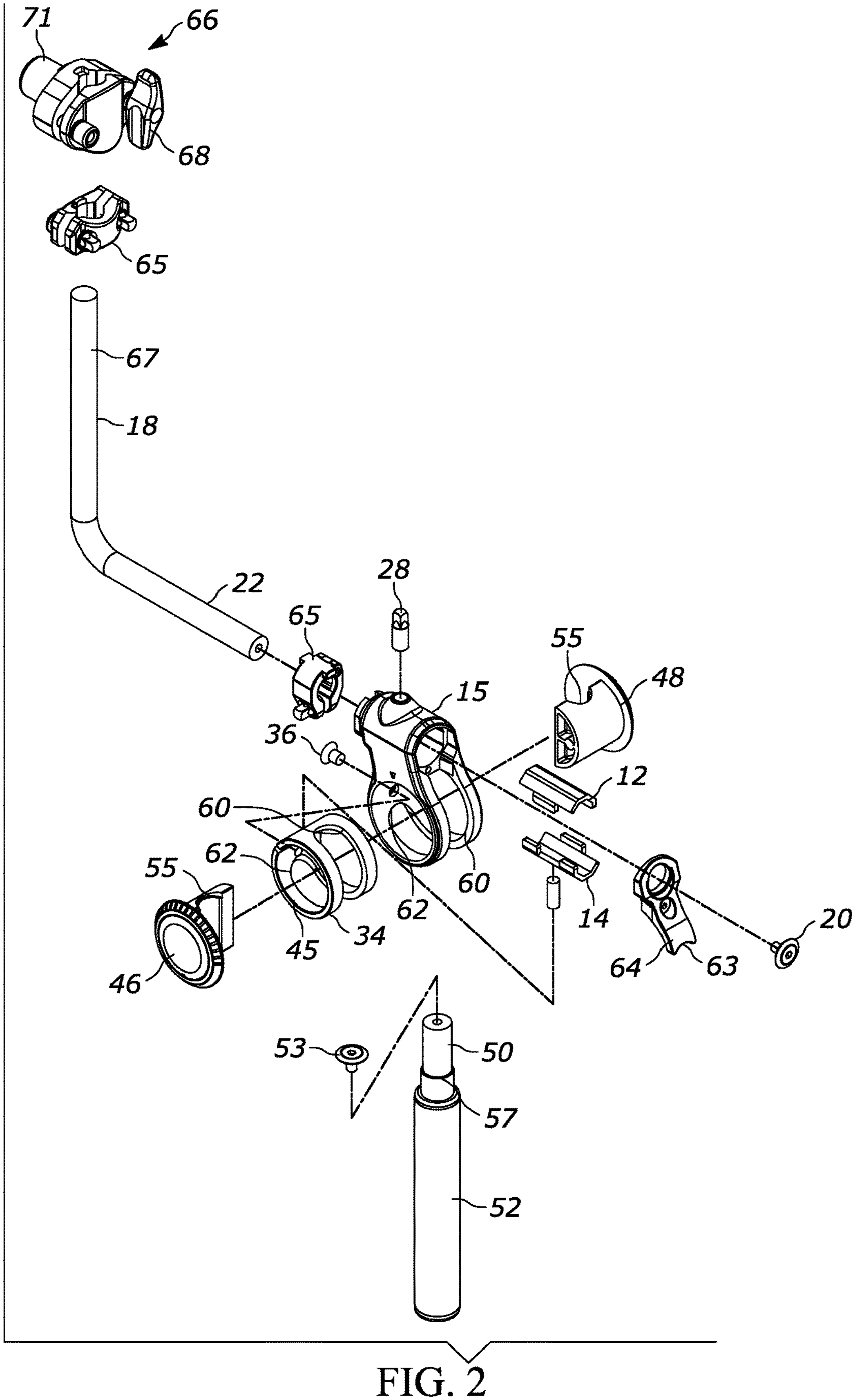
FIG. 2 is an exploded view of the holder system of FIG. 1.
Figure 3:
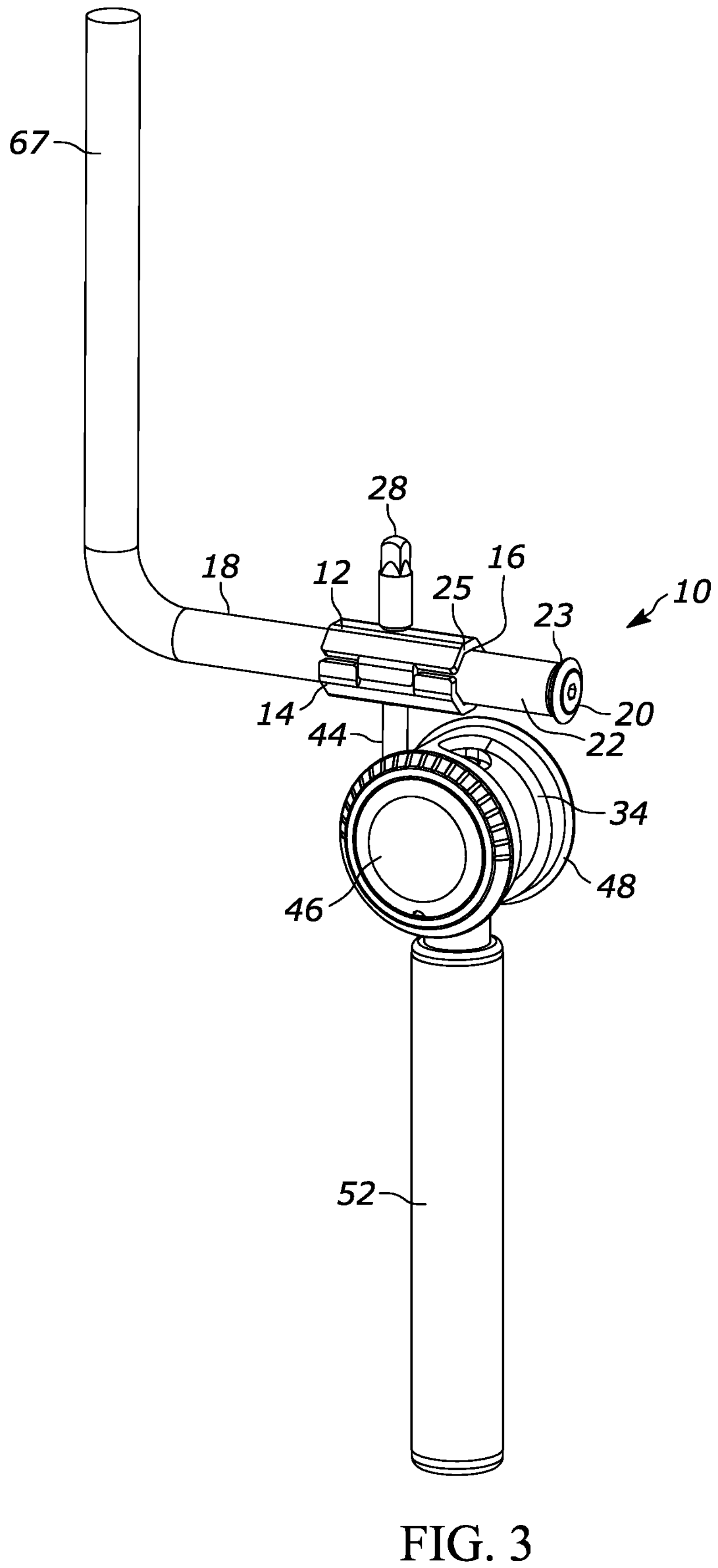
FIG. 3 is a view of the holder system of FIG. 1, shown with a rod adapter removed, and with a body removed for clarity of illustrating upper and lower holding members.
Figure 4:
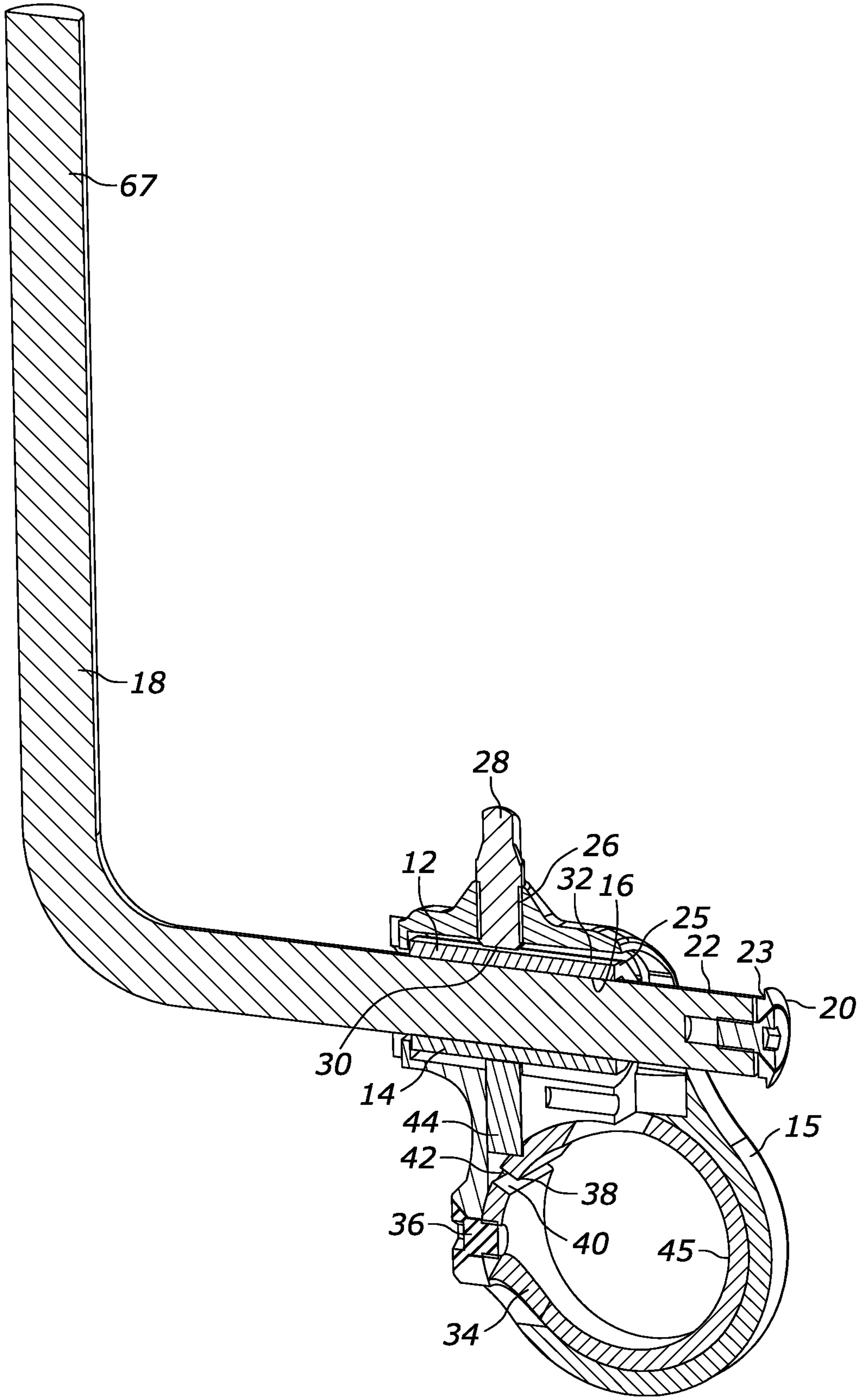
FIG. 4 is cross-sectional view of the upper and lower holding members, a holding rod and a body of the holder system of FIG. 1.

As best seen in FIGS. 2-4, a holding structure includes an upper holding member 12 and a lower holding member 14 each disposed within a body 15. The lower holding member 14 is coupled (preferably hinged) to the upper holding member 12 to define an adjustable opening 16. A holding rod 18 is received in the opening 16 such that when in an unsecured condition (not clamped upon by the holding members 12, 14), the holding rod 18 is permitted to be installed and to be moved linearly (to-and-fro) in the directions of arrow A and rotated in the directions of arrow B (see FIG. 6) with respect to the body 15. Once holding the rod 18 is inserted between the holding members 12, 14, a threaded, removable stop 20 at a first or proximal end 22 of the holding rod 18 (near holding members 12, 14) prevents the holding rod 18 from being removed from the holding members 12, 14, since a surface 23 of the stop 20 will engage an end surface 25 defined by the holding members 12, 14. The holding rod 18 can be entirely removed once the stop 20 is removed from the end 22 thereof.

As best seen in FIG. 4, the body 15 includes a portion having a threaded bore 26 for threadedly receiving a threaded fastener such as a key-bolt, hex-bolt or handle bolt 28. The fastener 28 is associated with the upper holding member 12 so that as the fastener 28 is tightened, a bottom surface 30 thereof engages an upper surface 32 of the upper holding member 12, which, together with the lower holding member 14, clamps on and secures the holding rod 18 with respect to the body 15.

Figure 5:
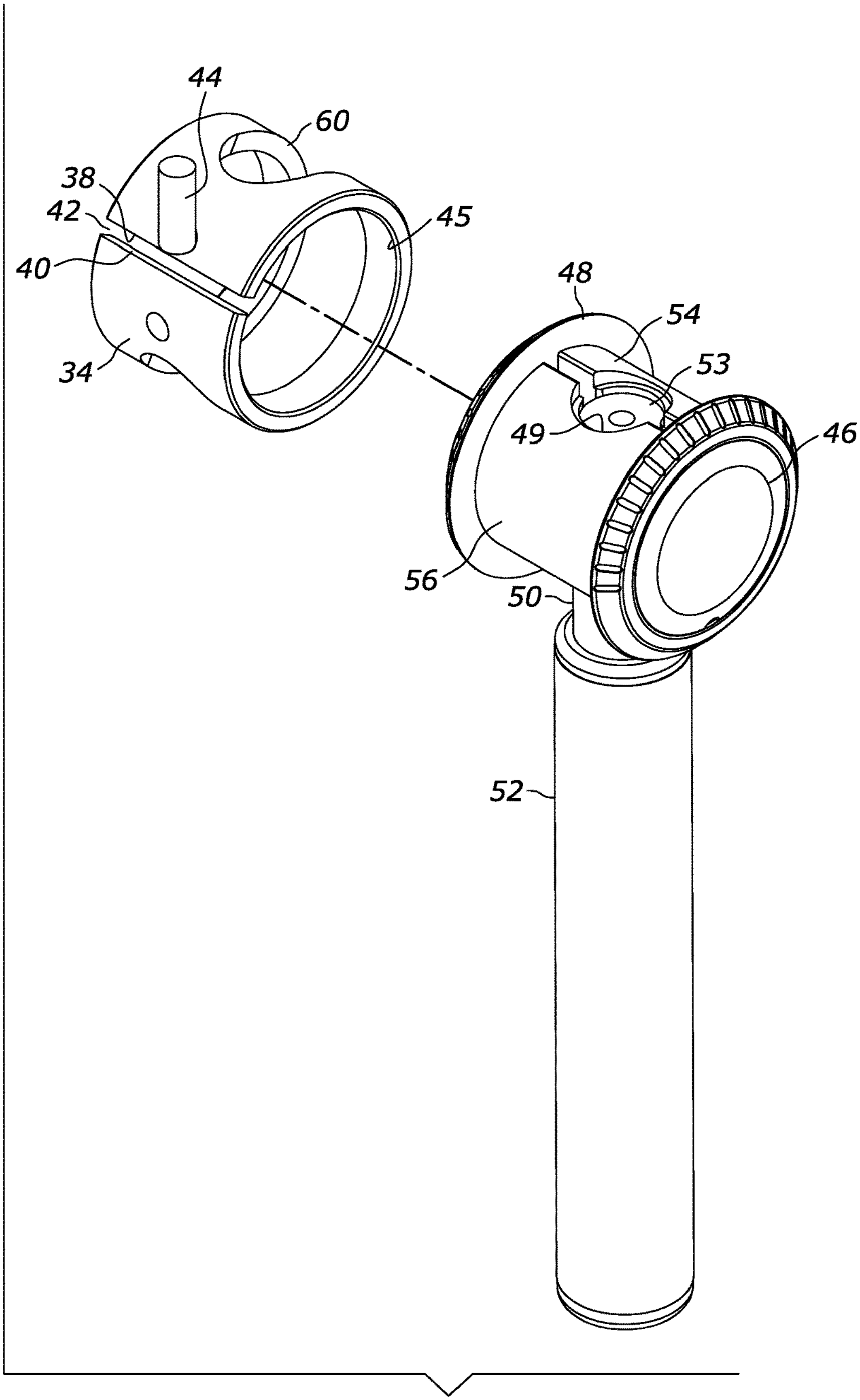
FIG. 5 is an exploded view of a split ring, clamping members and a vertical shaft of the holding system of FIG. 2.

With reference to FIG. 4, a resilient split ring 34 is fixed to the body 15 via a fastener, such as a screw 36, engaged therewith. As best seen in FIG. 5, the split ring 34 is generally cylindrical with opposing ends 38, 40 disposed in spaced relation due to a gap 42 there-between. Thus, due to the gap 42, the split ring includes an adjustable bore 45 there-through. A pin 44 is engaged with an indentation in the split ring 34, the function of which will be explained below.

As shown in FIGS. 2 and 5, a portion of a first clamping member 46 and of a second clamping member 48 is disposed in the bore 45 so as to rotate with respect to the body 15. In particular, portions 54 and 56 of the clamping members are generally half-cylindrical members that cooperate to define a generally cylindrical structure that is received in the interior bore 45 of the split ring 34. The cylindrical structure defines a shaft bore 49 that receives an end 50 of a vertical shaft 52 to permit the shaft to rotate about its vertical axis $X_2$ (FIG. 6) and to rotate with the clamping members 46, 48 with respect to the body 15. A stop member 53 at end 50 engages surfaces 55 of the clamping members 46, 48 to prevent downward movement of the shaft 52 in the direction of axis $X_2$ and a stop surface 57 on the shaft 52 engages a surface of the clamping members 46, 48 to prevent upward movement of the shaft 52 in the direction of axis $X_2$. The shaft 52 is used to connect with a clamp, adapter or bass drum mount and is preferably ⅞" (22.2 mm) in diameter. The body 15 and the split ring 34 each have co-operating arc-shaped openings 60 that permit the shaft 52 to rotate with respect to the body 15 a limited amount due to contact with a stop surface defined by at least one of the ends 62 of the openings 60 and an opposing stop surface 63 of body end 64 that is removably fixed to the body 15 (FIGS. 1 and 2). Body end 64 can be considered to be part of the body 15. The split ring 34 with associated pin 44 and the clamping members 46, 48 can be considered as part of clamping structure that is associated with the holding structure (holding members 12, 14) via the pin 44.

Figure 6:
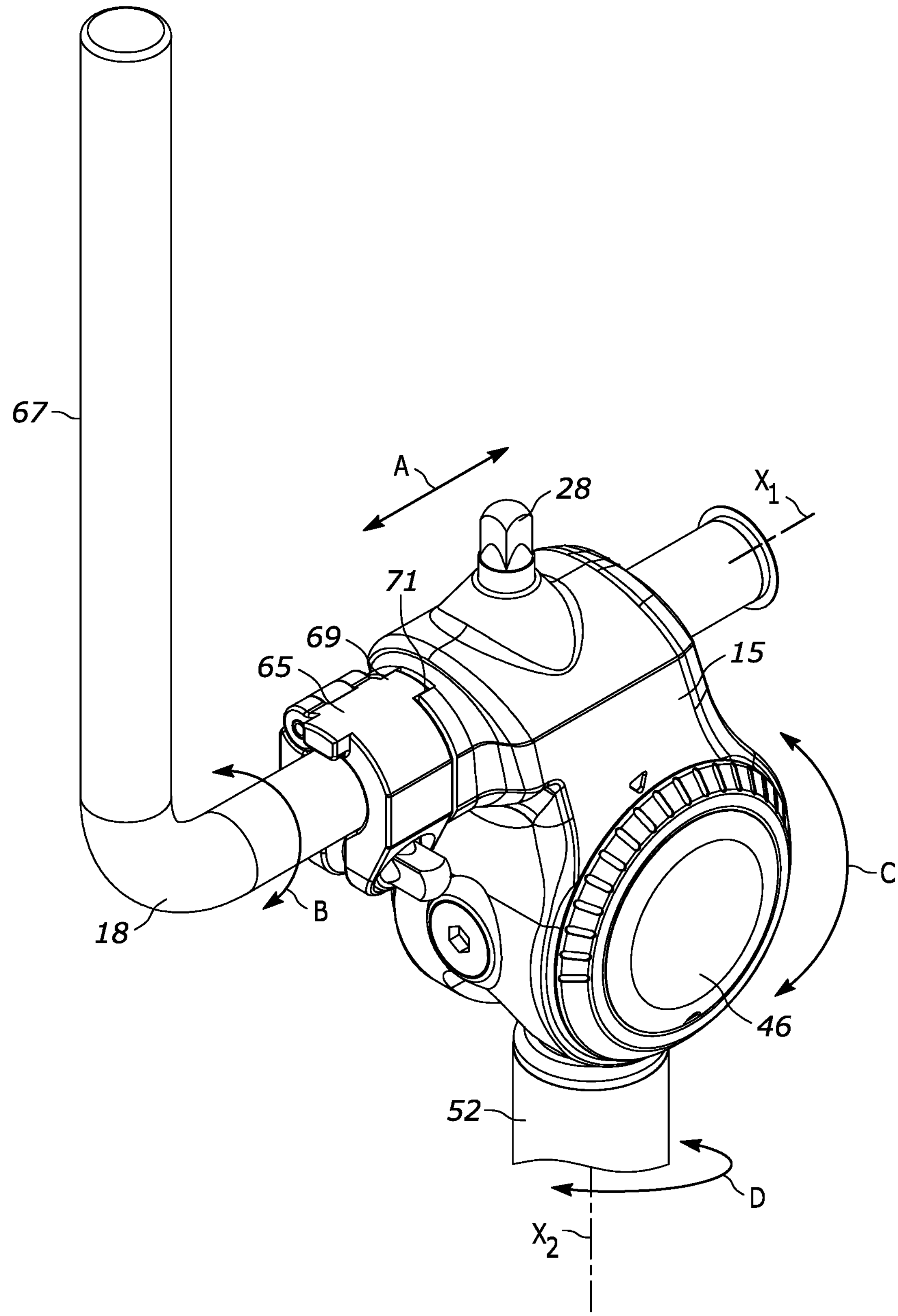
FIG. 6 is a perspective view of the holder system of FIG. 1, shown without the rod adapter attached, and showing various movements of the holder system when in an unclamped condition.

Thus, with reference to FIG. 6, when the holder system 10 is in an unsecured or unclamped condition, with the fastener 28 loosened, the holding rod 18 can be moved linearly in the directions of arrow A. An adjustable stop lock 65 can be clamped on the holding rod 18 to engage and prevent the body 15 from moving further along the holding rod 18. The stop lock 65 defines a specific mounting location of the body 15 with respect to the holding rod 18 and prevent twisting of the body 15 on the holding rod 18 since a tab 69 of the stop lock 65 engages a slot 71 in the body 15. In addition, when in the holder system 10 is in the unsecured or unclamped condition, the holding rod 18 can be rotated about axis $X_1$ (arrows B) and the shaft 52 can be rotated in openings 60 in the direction of arrows C. Shaft 52 can also rotate about its longitudinal axis $X_2$ (arrows D).

Returning to FIG. 4, once proper orientation of the holder system 10 is achieved, in a secured or clamped condition, when the fastener 28 moved (tightened) into engagement with surface 32 of the upper holding member 12, the upper holding member 12 is pushed downwardly causing opening 16 between the holding members 12, 14 to reduce in size and thus causing the holding members 12, 14 to clamp on and prevent any movement of the holding rod 18. Substantially simultaneously, due to the force of the fastener 28 on the upper holding member 12, the lower holding member 14 is moved downwardly to push the pin 44 downwardly. The pin 44 pushes on the resilient split ring 34 causing the distance (gap 42) between the opposing ends 38, 40 and thus bore 45 to reduce in size causing the split ring 34 to clamp on the clamping members 46, 48 (FIG. 5) to prevent any movement of the vertical shaft 52. Thus, a single movement (tightening) of the fastener 28 simultaneously locks the holding rod 18 and the vertical shaft 52 with respect to the body 15 in a secured condition. Also, a single movement (loosening) of the fastener 28 simultaneously permits, in the unsecured condition, the holding rod 18 and vertical shaft 52 to move in the directions of the arrows in FIG. 6. Since the holding members 12 and 14 are preferably of metal, no permanent deformation occurs upon repeated clamping and unclamping thereof.

Figure 7:
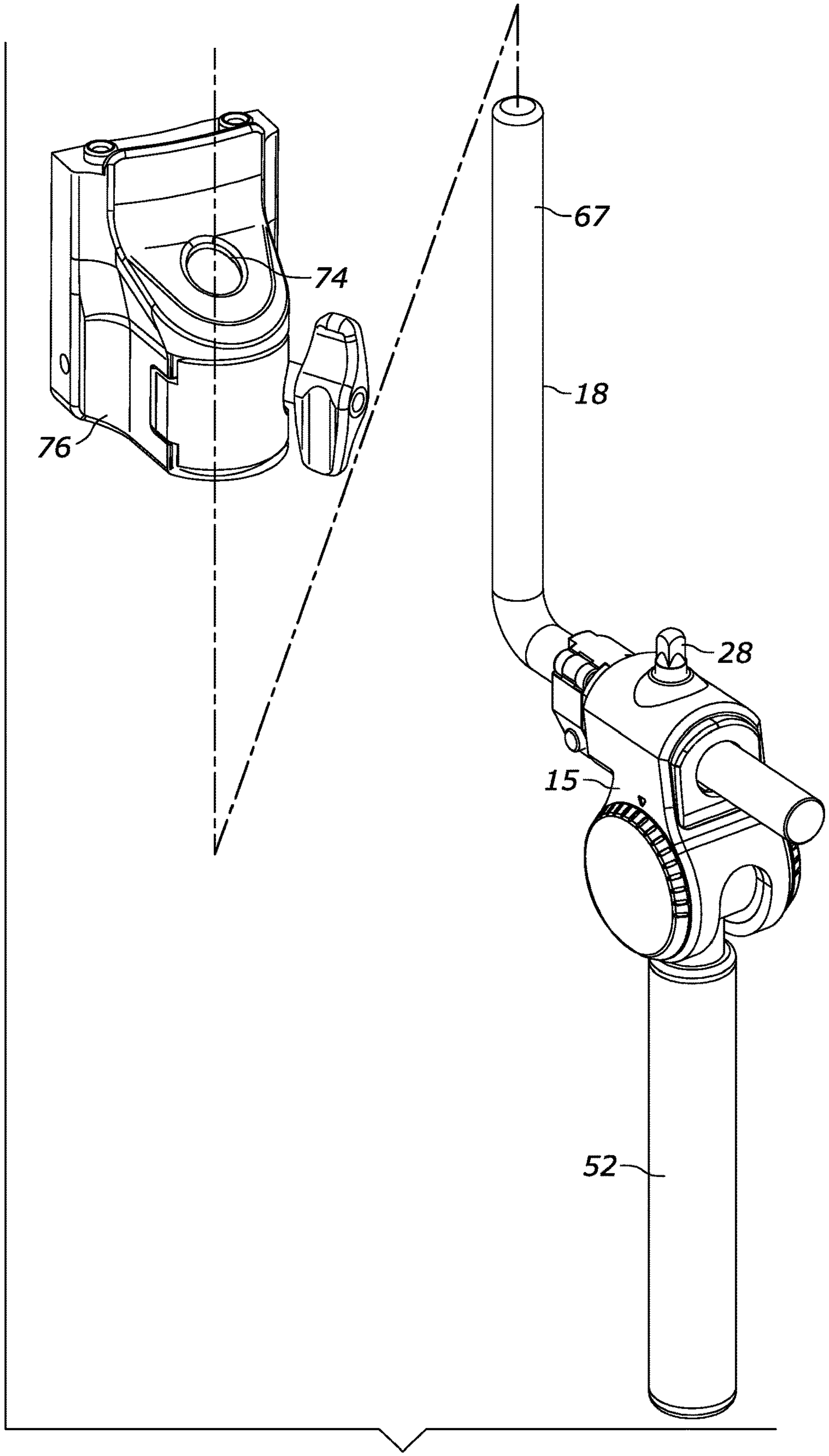
FIG. 7 is an exploded view of a holding rod of the holder system receiving a L-rod bracket.

With reference to the embodiment of FIGS. 1 and 2, the holding member 18 is configured as the L-rod type. A rod adapter, generally indicated at 66, is fixed to a distal end 67 end of the holding rod 18. The rod adapter 66 clamps to the holding rod 18 in a conventional manner by rotating handle 68 associated with a tightening screw 70. The rod adapter 66 includes the standard ⅞" (22.2 mm) horizontal shaft 71. A second stop lock 65 can be clamped on the holding rod 18 to ensure that once moved, the rod adapter 66 can be returned to its original location on the holding rod 18 defined by the stop lock location. The stop lock 65 can also prevent twisting of the adapter 66 on the holding rod 18 in the manner discussed above. With reference to FIG. 7, instead of providing the rod adapter 66 with the ⅞" (22.2 mm) shaft, the distal end 67 of the holding rod 18 can be received in an opening 74 in L-rod clamp 76, which can be part of a drum mount fixed to a drum.

Figure 8C:
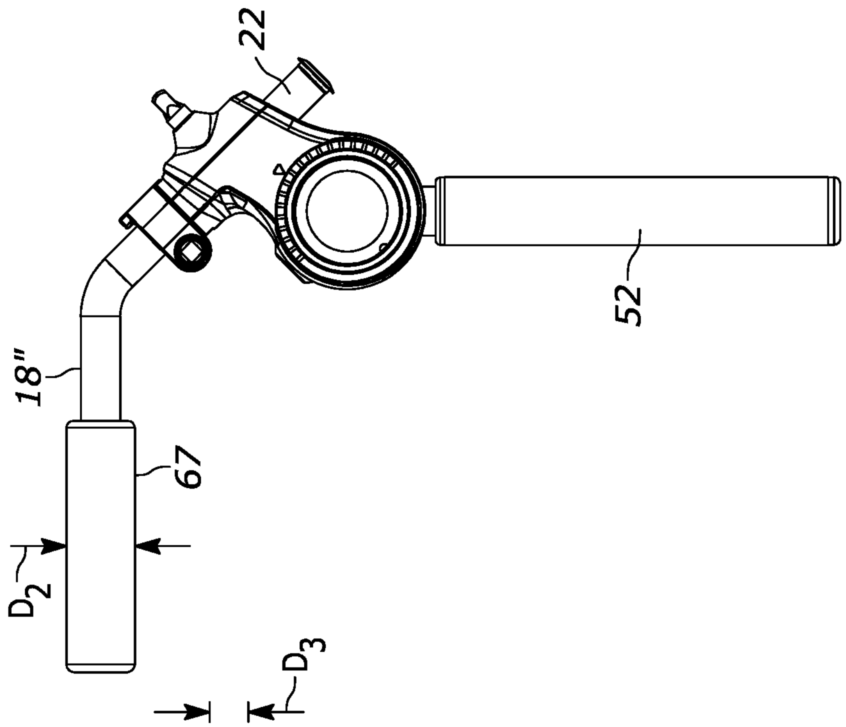
FIGS. 8A-8C are embodiments of the holder system accommodating holding rods with various diameters.
Figure 8B:
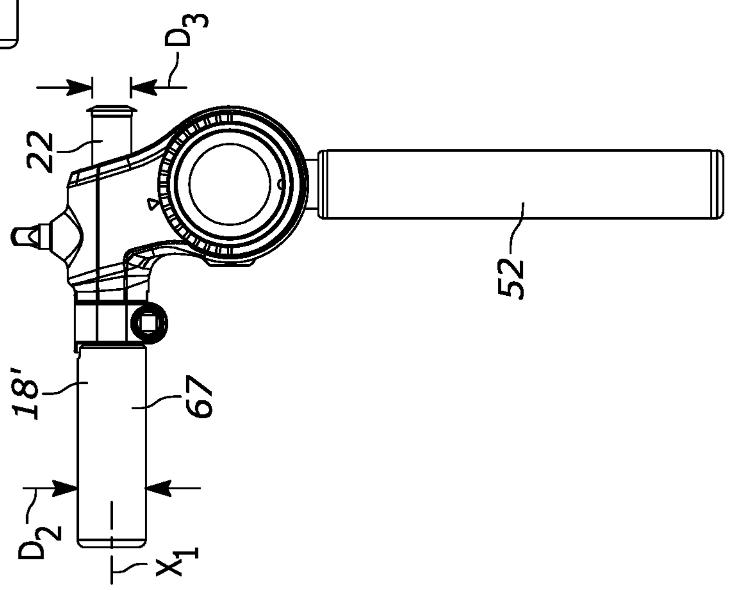
Figure 8A:
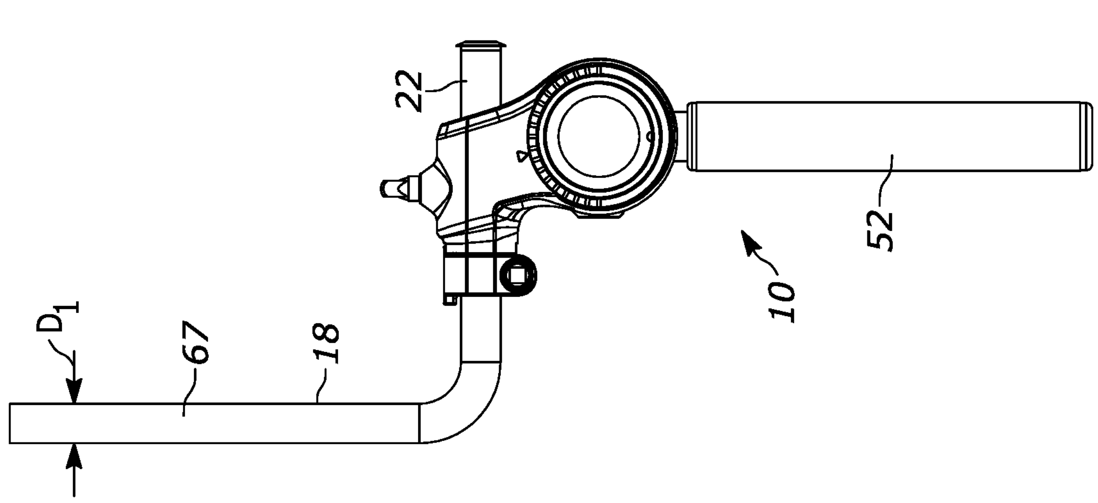

With reference to FIG. 8A, due to ability to remove the holding rod 18 at the first or proximal end 22 thereof from holding members 12, 14, vertically oriented holding rods 18 of varying diameters Di at the second or distal end 67 thereof (such as diameters of 9.5 mm, 10.5 mm, or 12.9 mm) can be employed. Also, the holding members 12, 14 can accept the proximal end 22 of various diameters (such as diameters of 9.5 mm, 10.5 mm, or 12.9 mm). Distal end 67 can be received in the rod adapter 66 or in the L-rod clamp 76. Also, as shown in FIG. 8B, distal end 67 of a horizontal holding rod 18' can be of the standard ⅞ inch (22.2 mm) diameter type, with the distal end 67 and proximal end 22 disposed on the same axis $X_1$ (a linear rod). Still further, FIG. 8C shows a holding rod 18" with the distal end 67 having the 22.2 mm diameter and with the distal end 67 being at a 45 degree angle with respect to the proximal end 22. Thus, holding rods 18' and 18" do not require the rod adapter 66. In each embodiment of the holding rods shown in FIGS. 8A, 8B, and 8C, the diameter $D_3$ of proximal end 22 can be the same diameter, such as 9.5 mm, 10.5 mm or 12.9 mm.

Thus, the holder system 10 for a drum that advantageously permits use of holding rods 18, 18', 18" of different diameters, permits the holding rod and vertical shaft 52 to move in various directions when unclamped, and permits simultaneously clamping (locking) and unclamping (unlocking) of the holding rod 18 and vertical shaft 52 upon a single manual movement of a fastener 28.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. The specification describes specific examples to accomplish a more general goal that may be accomplished in another way.

What is claimed is:

1. A holder system for a drum comprising:

a body, an upper holding member disposed within the body, a lower holding member disposed within the body and coupled to the upper holding member to define an adjustable opening between the upper and lower holding members, a fastener threadedly received in the body and engageable with a surface of the upper holding member, a holding rod having a proximal end received in the opening such that when the holding rod is in an unsecured condition when the fastener is not engaged with the holding member, the holding rod can be moved linearly and be rotated with respect to the body, a pin received in the body and associated with a surface of the lower holding member, a resilient, generally cylindrical split ring fixed to the body, the split ring having an adjustable bore there-through, the pin being engaged with the split ring, first and second clamping members having portions received in the bore of the split ring so as to be rotatable with respect to the body, and a shaft received by the first and second clamping members such that in the unsecured condition, the shaft can rotate about a longitudinal axis thereof, and rotate with respect to the body, wherein the holder system is constructed and arranged such that when the fastener is moved to engage the upper holding member, the upper holding member is pushed by the fastener causing the opening between the holding members to reduce in size and thus causing the holding members to clamp on and prevent any movement of the holding rod and, substantially simultaneously, the lower holding member pushes on the pin which causes the bore of the split ring to reduce in size causing the split ring to clamp on the clamping members to prevent any movement of the shaft, thereby defining a secured condition of the holding rod and shaft.

2. The holder system of claim 1, wherein the fastener is a key-bolt, a hex-bolt or a handle bolt.

3. The holder system of claim 1, wherein the split ring has opposing ends disposed in spaced relation with a gap there-between, and wherein reduction of a size of the gap causes reduction in the size of the bore of the split ring.

4. The holder system of claim 1, wherein the proximal end of the holding rod includes a removable stop having a surface constructed and arranged to engage surfaces of the holding members to prevent the holding rod to be removed from the holding members until the removable stop is removed.

5. The holder system of claim 1, wherein the body and the split ring include co-operating arc-shaped openings therein constructed and arranged to permit the shaft to rotate in a limited manner with respect to the body.

6. The holder system of claim 5, wherein the body has a body end defining a stop surface, and an end of at least one of the openings defining an opposing stop surface, the stop surfaces being constructed and arranged to engage a portion of the shaft to limit rotation of the shaft with respect to the body.

7. The holder system of claim 1, wherein the holding rod is configured as an L-rod.

8. The holder system of claim 7, further comprising a rod adapter fixed to a distal end of the holding rod, the rod adapter being constructed and arranged clamp upon the holding rod, the rod adapter including a 22.2 mm shaft.

9. The holder system of claim 8, further comprising a stop lock fixed to the distal end of the holding rod engaged with the rod adapter such ensure that once moved, the rod adapter can be again engaged with the stop lock and located at a position with respect to the holding rod defined by the location of the stop lock.

10. The holder system of claim 7, wherein a distal end of the L-rod has a diameter of 9.5 mm.

11. The holder system of claim 7, wherein a distal end of the L-rod has a diameter of 10.5 mm.

12. The holder system of claim 7, wherein a distal end of the L-rod has a diameter of 12.9 mm.

13. The holder system of claim 1, wherein a distal end of the holding rod has a diameter of 22.2 mm.

14. The holder system of claim 13, wherein the distal end and the proximal end of the holding rod is disposed on the same axis.

15. The holder system of claim 13, wherein the distal end of the holding rod is disposed at an angle of 45 degrees with respect to the proximal end thereof.

16. The holder system of claim 1, wherein the portions of the clamping members are generally half-cylindrical portions that cooperate to define a generally cylindrical structure that is received in the bore of the split ring, the generally cylindrical structure defining a shaft bore for receiving the shaft.

17. The holder system of claim 16, wherein the shaft is mounted with respect to the clamping members in the shaft bore such that the shaft is prevented from moving linearly with respect to the longitudinal axis thereof.

18. The holder system of claim 1, further comprising a stop lock mounted on the holding rod constructed and arranged to engage a portion of the body to define a mounting location of the body with respect to the holding rod.

19. A holder system for a drum comprising:

a body, holding structure disposed within the body to define an adjustable opening, a fastener threadedly received in the body and engageable with the holding structure, a holding rod having a proximal end received in the opening such that when the holding rod is in an unsecured condition when the fastener is not engaged with the holding structure, the holding rod can be moved linearly and be rotated with respect to the body, clamping structure having a portion disposed within the body and being associated with the holding structure, and a shaft received by the portion of the clamping structure such that in the unsecured condition, the shaft can rotate about a longitudinal axis thereof, and rotate with respect to the body, wherein the holder system is constructed and arranged such that when the fastener moved to engage with the holding structure, the engagement causes the opening to reduce in size and thus causes the holding structure to clamp on and prevent any movement of the holding rod and, substantially simultaneously, a portion of the holding structure engages a part of the clamping structure causing the clamping structure to prevent any movement of the shaft, thereby defining a secured condition of the holding rod and shaft.

20. The holder system of claim 19, wherein the holding structure comprises:

an upper holding member disposed within the body, a lower holding member disposed within the body and coupled to the upper holding member to define the adjustable opening between the upper and lower holding members, and wherein the clamping structure comprises:

a pin received in the body and associated with a surface of the lower holding member, a resilient, generally cylindrical split ring fixed to the body, the split ring having an adjustable bore therethrough, the pin being engaged with the split ring, and first and second clamping members having portions received in the bore of the split ring so as to be rotatable with respect to the body, the first and second clamping members receiving the shaft, wherein the holder system is constructed and arranged such that when the fastener is moved to engage the upper holding member, the upper holding member is pushed by the fastener causing the opening between the holding members to reduce in size and thus causing the holding members to clamp on and prevent any movement of the holding rod and, substantially simultaneously, the lower holding member pushes on the pin which causes the bore of the split ring to reduce in size causing the split ring to clamp on the clamping members to prevent any movement of the shaft, thereby defining a secured condition of the holding rod and shaft.

* * * * *